United States Patent
Pinault

(10) Patent No.: US 6,192,235 B1
(45) Date of Patent: *Feb. 20, 2001

(54) PUBLIC TELECOMMUNICATION TERMINAL, IN PARTICULAR FOR MOBILE RADIO NETWORKS

(75) Inventor: Francis Pinault, Bois Colombes (FR)

(73) Assignee: Alcatel Mobile Phones, Paris (FR)

( * ) Notice: This patent issued on a continued prosecution application filed under 37 CFR 1.53(d), and is subject to the twenty year patent term provisions of 35 U.S.C. 154(a)(2).

Under 35 U.S.C. 154(b), the term of this patent shall be extended for 0 days.

(21) Appl. No.: 08/715,413

(22) Filed: Sep. 18, 1996

(30) Foreign Application Priority Data

Sep. 19, 1995 (FR) .................................. 95 10958

(51) Int. Cl.[7] ...................................... H04M 3/42
(52) U.S. Cl. ........................ 455/418; 455/410; 455/558
(58) Field of Search .................................. 455/418, 410, 455/419, 550, 551, 552, 558, 565, 186.1

(56) References Cited

U.S. PATENT DOCUMENTS

| 4,908,848 | * | 3/1990 | Hanawa | ............................... 455/56 |
| 5,371,493 | * | 12/1994 | Sharpe et al. | ................... 340/825.34 |
| 5,404,580 | * | 4/1995 | Simpson et al. | ..................... 455/558 |

FOREIGN PATENT DOCUMENTS

| 0369110A2 | 5/1990 | (EP) . |
| 0444479A2 | 9/1991 | (EP) . |

* cited by examiner

Primary Examiner—Lee Nguyen
(74) Attorney, Agent, or Firm—Sughrue, Mion, Zinn, Macpeak & Seas, PLLC

(57) ABSTRACT

A mobile radio network provides additional services over and above a basic service. A public telecommunication terminal suitable for this network has provision for entry of terminal control data. The terminal recognizes additional service control data and prohibits action on data thus recognized.

3 Claims, 1 Drawing Sheet

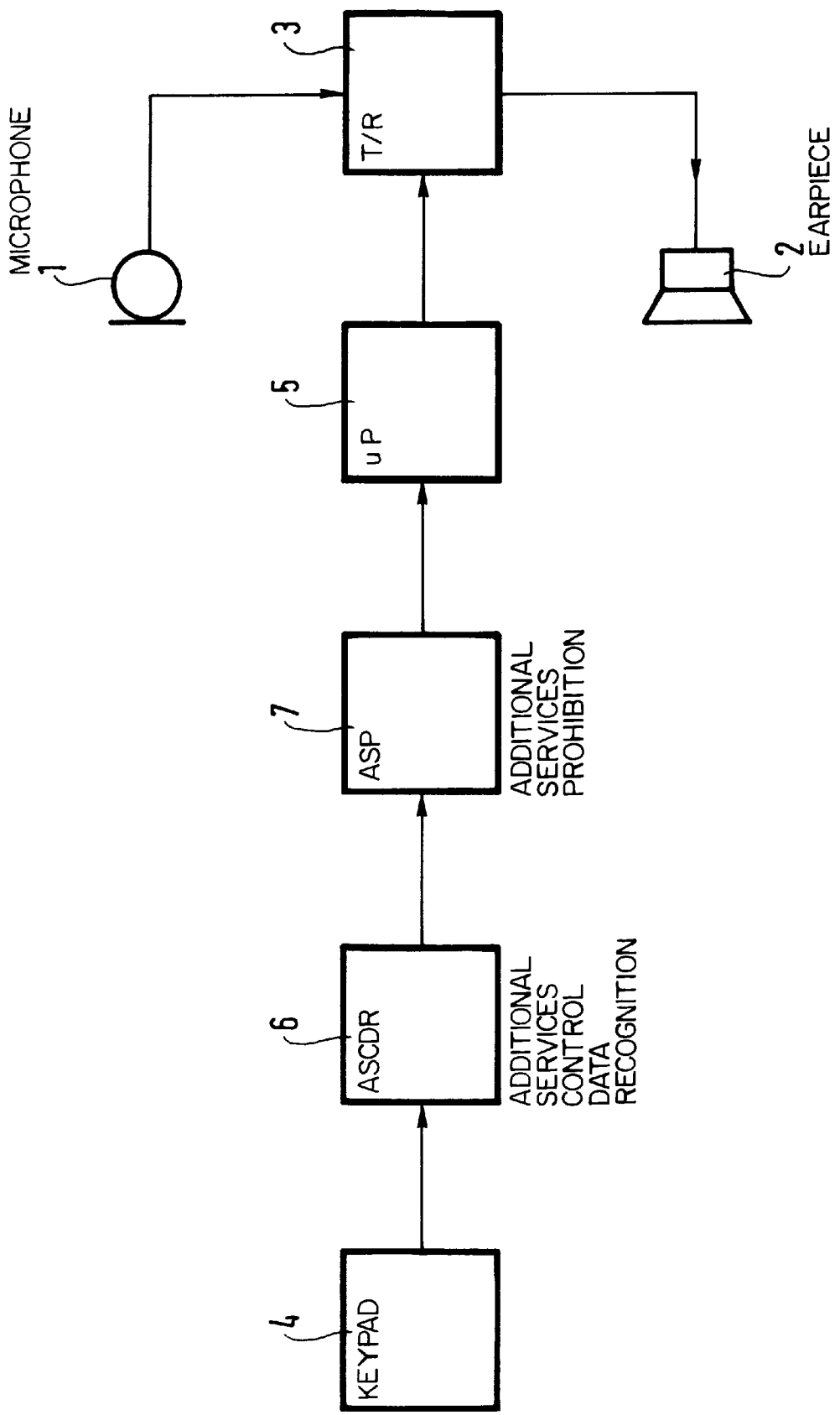

PUBLIC TELECOMMUNICATION TERMINAL, IN PARTICULAR FOR MOBILE RADIO NETWORKS

BACKGROUND OF THE INVENTION

1. Field of the Invention

The present invention concerns a public telecommunication terminal, in particular for mobile radio networks.

2. Description of the Prior Art

The present invention is applicable to modern mobile radio networks of the GSM ("Global System for Mobile communications") type, for example.

A public or private telecommunication terminal generally includes, in addition to telecommunication means proper, a man-machine interface including means (for example a keypad) enabling the user to enter control data for the terminal.

This control data naturally includes data that is essential to the provision of a basic service provided by the network concerned, such as dialing data in particular, but may include other data, especially in modern telecommunication networks.

In particular, in mobile radio networks such as the GSM network, for example, the data may include such other data relating to the control of so-called supplementary services.

These supplementary services include, for example:

outgoing call barring, outgoing call restriction (e.g. barring of international calls), incoming call barring, diversion of incoming calls to a different number, etc.

The fact that the user of a terminal can control the supplementary services, to which he requires access through the keypad on the terminal represents a problem when the terminal is a public terminal, namely that a terminal of this kind may be totally or partially inoperative after a maneuver of this kind.

An essential aim of the present invention is to solve this problem.

In mobile radio networks such as the GSM network, for example, in which information is stored in a card such as the "SIM" ("Subscriber Identity Module") card, for example, inserted into the terminal to enable it to be used, this control data may also include data relating to control of services associated with the card. As these services may modify or delete information stored in the card, a card inserted into a public terminal may entail the risk of the terminal becoming totally or partially inoperative as a result of their activation. A problem of a similar nature to that previously mentioned in connection with the supplementary services then arises; for this reason the following description lumps together these two types of services, namely supplementary services and card-related services, with particular reference to the "SIM" card, under the generic name of additional services.

SUMMARY OF THE INVENTION

The present invention consists of a public telecommunication terminal, suitable for mobile radio networks, the network being adapted to provide additional services over and above a basic service and said terminal including terminal control data entry means, wherein said terminal further includes means for recognizing additional service control data and means for prohibiting action on data thus recognized.

BRIEF DESCRIPTION OF THE DRAWINGS

Other objects and features of the present invention will emerge from a reading of the following description of one embodiment given with reference to the accompanying drawing in which the single FIGURE is a general block diagram of one embodiment of the terminal of the invention.

DETAILED DESCRIPTION OF THE PREFERRED EMBODIMENT

The terminal shown schematically in the FIGURE includes:

telecommunication means proper, for example a microphone 1 and an earpiece 2 connected to transmitter-receiver means 3, means, for entering terminal control data, in the form of a keypad 4, for example, means, 5 for controlling the operation of the terminal on the basis of control data entered in this way, for example data processing means such as a microprocessor.

In accordance with the invention, the terminal further includes:

means 6 for recognizing data entered via the data entry means 4 and relating to the control of additional services, as defined above, means 7 for prohibiting action on data so recognized.

The additional services control data generally comprises predefined sequences such as, for example, in the case of an application to a GSM network, the following sequence: *21* diversion number # for diverting calls.

Other examples of sequences in this typical application can be found in the specifications of the GSM system or in the book by Michel MOULY and Marie-Bernadette PAUTET entitled "The GSM system for mobile communications" (ISBN: 2-9507190-0-7).

The means 6 then includes means for identifying such sequences.

As the implementation of such means does not represent any particular problem, it will not be described in detail here.

Further, in the case of control means 5 comprising data processing means such as a microprocessor, for example, the means 6 may be incorporated into the software of the data processing means.

Also in the case of control means 5 consisting of data processing means such as a microprocessor, for example, the means 7 for prohibiting action by the means 5 on data recognized in the manner described can be incorporated into the software of the data processing means.

There is claimed:

1. Public telecommunication terminal, suitable for mobile radio networks, the network being adapted to provide additional services over and above a basic service, said additional services including control of a configuration of said public telecommunication terminal, said terminal comprising:

terminal control data entry means for entering basic and additional service control data, wherein said public telecommunication terminal is adapted to take action on said additional service control data to change said configuration of said public telecommunication terminal in accordance with said additional service control data;

data recognition means for recognizing said entered additional service control data; and prohibiting means for prohibiting said action on said additional service control data recognized by said data recognition means.

2. Terminal according to claim 1 wherein said additional services are constituted by supplementary services.

3. Terminal according to claim 1 wherein said additional services are constituted by services related to a card adapted to be inserted into said terminal to enable said terminal to be used.

* * * * *